Figure 1:
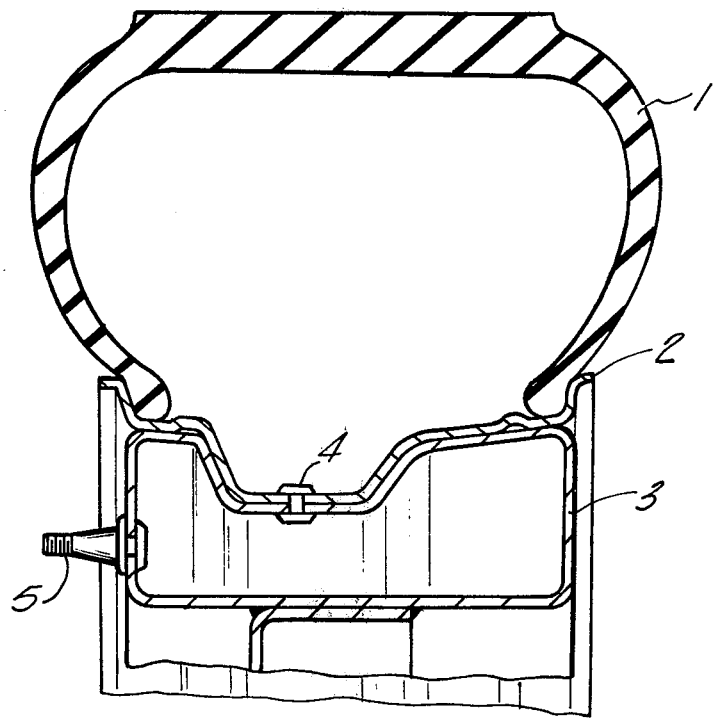

United States Patent [19]

Rivin

[11] 4,289,187
[45] Sep. 15, 1981

[54] PNEUMATIC WHEELS FOR VEHICLES

[76] Inventor: Evgeny I. Rivin, 1114 Pierre Ave., Windsor, Ontario, Canada, N9A 2L4

[21] Appl. No.: 946,497

[22] Filed: Sep. 28, 1978

Related U.S. Application Data

[63] Continuation-in-part of Ser. No. 830,073, Sep. 2, 1977, abandoned.

[51] Int. Cl.³ .................... B60C 23/10; B60C 29/00
[52] U.S. Cl. .................................. 152/418; 138/30; 152/331; 152/349; 267/64.23
[58] Field of Search .................. 152/418, 330 R, 331, 152/349, 415, 427, 10; 141/4, 67, 329; 295/12, 31 A; 267/35, 65 A; 138/37, 30

[56] References Cited

U.S. PATENT DOCUMENTS

| | | | |
|---|---|---|---|
| 1,016,558 | 2/1912 | Garrison | 152/418 |
| 1,173,008 | 2/1916 | Lewis | 152/418 |
| 1,185,175 | 5/1916 | Burton | 152/418 |
| 2,773,686 | 12/1956 | Nash | 267/65 A |
| 3,915,421 | 10/1975 | Le Forestier | 267/65 A |
| 3,971,425 | 7/1976 | Tsuruta | 152/418 |

FOREIGN PATENT DOCUMENTS 910989 7/1949 Fed. Rep. of Germany ...... 152/418

OTHER PUBLICATIONS

Taylor et al., "Experience Relating to the Steady Performance ... Bearings, Proceedings", Institute of Mech. Engr. vol. 189 22/75

Primary Examiner—John E. Kittle
Assistant Examiner—Thomas Bokan
Attorney, Agent, or Firm—Krass, Young & Schivley

[57] ABSTRACT

A pneumatic vehicle wheel contains, within or on the hub, a closed air reservoir or reservoirs, connected by one or more channels to the air cavity in the tire. The dimensions of the channels are such as to allow restricted bidirectional flow of air between the tire and the reservoir, dissipating energy during the flow, for the purpose of improving the vibration resistance quality of the wheel throughout the frequency range.

3 Claims, 2 Drawing Figures

PNEUMATIC WHEELS FOR VEHICLES

REFERENCE TO RELATED APPLICATIONS

This application is a continuation-in-part of application Ser. No. 830,073, filed Sept. 2, 1977, abandoned.

BACKGROUND OF THE INVENTION

1. Field of the Invention

This invention relates to pneumatic vehicle wheels and the means for improving the behavior of such wheels under conditions of vibration caused by an uneven road surface.

2. Description of the Prior Art

Most modern means of transportation are equipped with wheels having pneumatic tires containing compressed gas (air). Besides the main task—to insure reliable grip with the road surface—pneumatic tires also create a resilient connection between the vehicle and the road surface in which the resilience depends mainly on the pressure of air in the tire. The damping effect of this resilient connection is usually very small and is determined mainly by the damping characteristics of the tire material. As a result, when disturbances from the road have frequencies sufficiently higher than the natural frequency of the vehicle/tire system the tires behave as vibration dampers, but for vibration frequencies close to said natural frequencies, tires tend to worsen the vibration effect on the vehicle. If the vehicle has a suspension system, the harmful increases of the vibration effect on the vehicle when the frequency is near the natural frequency of the vehicle/tire system are reduced, because the natural frequency of the suspension system is usually much lower than that of the tire itself. However, even a limited increase of the vibration level at the tires's natural frequency is very unpleasant and in many cases can force the designer to lower the natural frequency of the suspension system. Especially bad consequences for the strength of the vehicle and its component units, passenger comfort, cargo conditions, etc., are encountered in cases when the tires are the sole resilient element, such as in wheeled tractors or bicycles. Using the tires themselves as part of the suspension system will reduce the effects of vibration on the vehicle. This can be accomplished by providing a means by which the pressure in the tire changes in response to external disturbances, and means by which a part of vibrational energy is dissipated in the form of heat, thereby damping road shocks.

Some existing systems for altering tire pressure are intended to merely replace air lost in the normal course of operation or to allow different pressures for on or off-road conditions. There are also systems directed, as is the present invention, toward dynamically changing the pressure during operation and in response to road conditions. One of these systems (U.S. Pat. No. 2,216,854 to R. S. Sanford) involves chassis-mounted pressure tanks connected through the axle to the tires by a rotational coupling. A valve system senses pressure changes in the tires and constantly vents excess pressure to the atmosphere and replaces lost pressure from the pressure tanks. The inherent complexity and cost of the rotational couplings and the valving system, along with the requirement to refill the pressure tanks when depleted, make this design unattractive.

A simplified system, disclosed in U.S. Pat. No. 2,690,779 to J. P. Rust, approaches the problem by placing, inside the tire cavity itself, an extra chamber that will assume its share of the pressure increase, via a valve that is substantially one-way, when the tire is compressed, and that then maintains its high pressure when the tire assumes its normal expanded shape, bleeding air back to the tire cavity at a rate that gradually increases the tire pressure to normal levels. The valving required within the tire, however, still presents a complexity problem, and it could produce rotational imbalance in the wheel.

SUMMARY OF THE INVENTION

The present invention is directed toward a means for solving the above stated problem by changing the manner and rate at which the pressure internal to the tire changes when the tire is deformed by an irregularity in the road surface. This alteration in the tire's pneumatic characteristics is achieved, briefly, by providing an air reservoir within or on the wheel hub that is connected to the air space in the tire by one or more channels that partially restrict flow between the two in both directions. Air flow through the restricted channels, resulting from variations in forces between the vehicle and roadway during driving, produces a dissipation of energy in the form of heat, thereby damping the force variations. By thus reducing or eliminating the amplification of external disturbances and at the same time maintaining the vibration resistant characteristics of the wheel in the high frequency range, the suspension system of a vehicle can be simplified.

The preferred embodiment of the invention would be easily produced and would be compatible with regular tires in use today.

Figure 2:
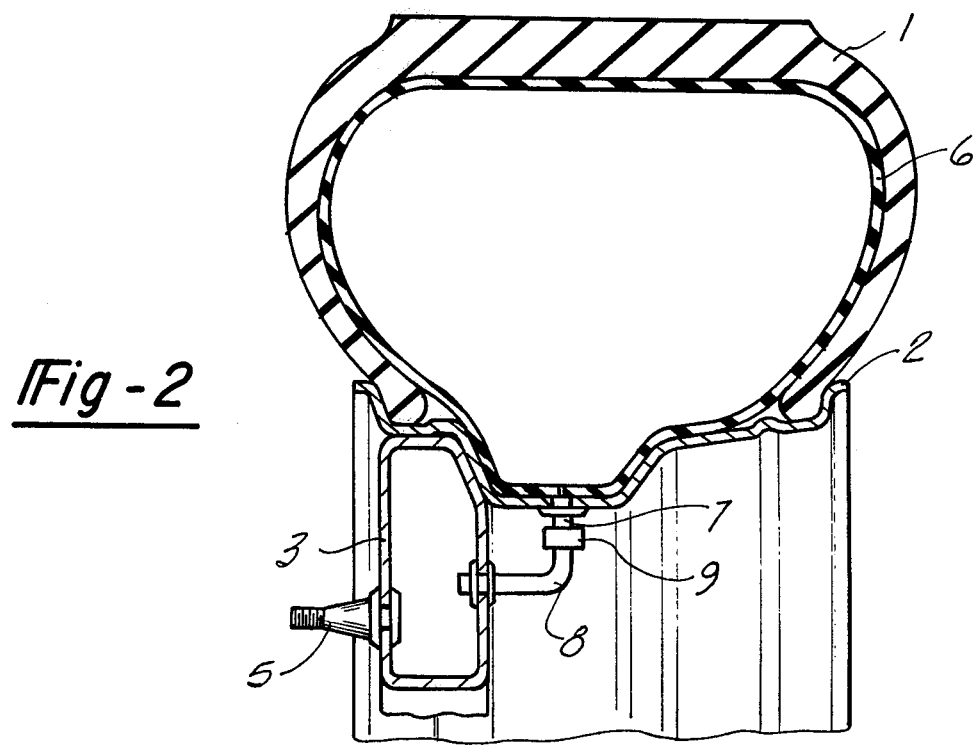

The description makes reference to the accompanying drawings in which:

FIG. 1 is an axial section of one version of the wheel design in which an innertubeless tire is used; and FIG. 2 is an axial section of another version of the wheel design in which a tire with an innertube is used.

In FIG. 1, the tire 1, in this case with no innertube, is mounted on the wheel rim 2. Inside and fixed to said rim 2 is the reservoir 3, symmetrical with respect to the axis of rotation of the wheel. The inner cavity of said reservoir 3 is connected by at least one channel 4 of specified dimensions which passes through the walls of the reservoir 3 and through the rim 2. The nature of the dimensions of the channel 4 will subsequently be described. The design of the wheel and outline of the wheel rim will vary depending on the presence of a brake system, the type of connection between the wheel and the axle, etc., and accordingly the shape and location of the reservoir 3 can be modified to fit the particular circumstances. Thus, one or several of the walls of the reservoir 3 could serve as structural parts of the rim itself; or the reservoir 3 could be made up of several separate sub-reservoirs disposed in such a manner as not to induce non-balanced centrifugal forces during rotation of the wheel, each sub-reservoir connected by channel(s) with the inner cavity of the tire (or innertube) and/or another sub-reservoir.

FIG. 2 illustrates another version of the pneumatic wheel according to the invention in which the reservoir 3 is situated in the inner space of the wheel rim 2. Since the tire in FIG. 2 has an innertube 6, the connection between the cavity of the innertube 6 and the reservoir 3 is by an innertube valve 7 and nipple 8 which is part of the reservoir 3. The valve 7 and the nipple 8 are connected by means of a common fitting (design details not shown).

If the vehicle is stationary or if the wheel is rolling on an absolutely smooth and even surface, then the air pressure in the cavity of the tire and in the reservoir 3 will be of the same magnitude because of the connecting channels 4. When the tire rides onto some road protuberance, air pressure in the tire cavity will change as a function of the shape and size of the protuberance and of the dynamics of the vehicle. The pressure in the reservoir 3 will also change in this case but more slowly because of the flow-resistance of the channels 4. Therefore, there will be a pressure difference between the tire cavity and the reservoir 3. Thus, the wheel riding onto the protuberance will create, in addition to deformation of the tire as with common designs, a difference of air pressure between the tire 1 and the reservoir 3, and consequent irreversible energy losses during restricted air flow through the channels 4 in an effort to equalize the pressure difference.

The energy losses produce a damping action. The intensity of the damping action can be increased without changing the dimensions of the reservoir 3 or the channels 4 by making the walls of the reservoir 3 flexible (of rubber, for example). In this case air flow from the tire 1 to the reservoir 3 will increase the air pressure in the latter and consequently will inflate the reservoir 3. Because of its flexible walls, air pressure in the reservoir 3 would rise slower than in the case of rigid walls and the pressure difference between the tire 1 and the reservoir 3 would be higher thus intensifying the air flow through the channel 4 and so increasing the energy dissipation.

An additional feature of the invention is the safety factor in the case of a common tire puncture. When punctured, air pressure in the tire cavity would drop slower than without the reservoir 3, thus giving the driver more time for emergency braking.

At high frequencies of road disturbances, air flow oscillations in the channels 4 would not follow the air pressure oscillations in the tire 1 or innertube 6, thus the reservoir would be effectively switched off and the wheel stiffness becomes equal to the tire stiffness $k_t$. At very low frequencies of disturbances the air pressure variations in the reservoir 3 would follow pressure variations in the tire 1 or innertube 6, thus the wheel stiffness $k_o$ in this case would be determined by the total volume of the tire 1 or innertube 6 (volume $v_t$) plus the volume of the reservoir 3 (volume $v_r$), or $$k_o = k_t \frac{v_t}{v_t + v_r}$$

The greater the restriction of the channels 4, the lower the frequency at which the reservoir is effectively switched off. At any intermediate frequency the value of stiffness would be also intermediate between $k_o$ and $k_t$. With such a variable stiffness of the wheel the amplitude-frequency characteristic of an oscillating system that is the ratio of amplitude $y_o$ of the vehicle center-of-gravity displacement to amplitude $x_o$ of road unevenness (versus angular frequency w of the excitation) is approximately $$\frac{y_o}{x_o} = \sqrt{\frac{1 + \left(\frac{v_r \cdot \mu \cdot l}{n \cdot p_o \cdot \phi \cdot A}\right)^2 w^2}{\left(1 - \frac{v_t + v_r}{v_t} \frac{w^2}{w_t^2}\right)^2 + \left(\frac{v_r \cdot \mu \cdot l}{n \cdot p_o \cdot \phi \cdot A}\right)^2 \left(1 - \frac{w^2}{w_t^2}\right)^2}}$$

where $p_o$—initial pressure in a tire cavity (inner tube);

$$w_t = \sqrt{\frac{k_t}{m}}$$

—angular natural frequency of the vehicle on wheels when reservoirs 3 are switched off; m=portion of vehicle mass acting on a wheel; A=cross section area of the channel; l=length of the connective canal; $\phi$=viscous permeability of the connective canal ($\phi=l^2/12$ for a rectangular slot cross section capillary, where l is the height of the slot; $\phi=d^2/32$ for a round capillary of diameter d; $\phi$ is determined experimentally for porous media or other complex shapes of a connecting canal) see "Experience Relating to the Steady Performance of Aerostatic Porous Thrust Bearings" by R. Taylor BSc, G. K. Lewis, PhD, CEng, MIMechE, Proceedings of the Institute of Mechanical Engineers, Volume 189, 22/75. $\mu$—dynamic viscosity of media inside the cavity; n—polytropic exponent (n=1.4 for air).

Optimal dynamic status of the vehicle on tires would be achieved if the viscous permeability of the connecting canal 4 or 7 is selected to fulfill the condition $$\phi = B \frac{v_r \mu l}{n p_o A} \frac{w_o}{\sqrt{\left(\frac{v_r}{v_t} + 1\right)\left(\frac{v_r}{v_t} + 2\right)}}$$

where $1.4 \leq B \leq 7$ depending on typical excitation from the road surface. B should be close to 1.4 for harmonic tire excitation from the road surface; 2–3 for white noise type random excitation; 4.0–7.0 for pulse tire excitation. When the excitation character during the use of the vehicle is not known or can vary $3 \leq B \leq 4$ should be selected.

The embodiments of the invention in which an exclusive property or privilege is claimed are defined as follows:

1. In a vehicle having a body, wheels rotatably supported on the body, and inflated fluid tires on the wheel, the improvement comprising: a fluid chamber supported on the wheel; and a structure defining a bi-directional energy dissipating orifice connecting the interior of the chamber with the pressurized volume within the tire, the structure defining the orifice having a viscous permeability $$\phi = B \frac{v_r \mu l}{n p_o A} \frac{w_o}{\sqrt{\left(\frac{v_r}{v_t} + 1\right)\left(\frac{v_r}{v_t} + 2\right)}}$$

where $1.4 \leq B \leq 7$ depending on typical excitation from the road surface, where $\phi$ = viscous permeability of the connective canal, $v_r$ = the volume of the chamber; $\mu$ = the dynamic viscosity of media inside the cavity, $l$ = the length of the connective canal, $n$ = the polytropic exponent of the fluid, $p_o$ = the initial pressure in the tire cavity, $A$ = the cross sectional area of the orifice, $w_o$ = the angular natural frequency of the tire, $v_t$ = the volume of the tire, whereby rapid increases in the pressure within the tire as a result of the impact of the tire with obstacles causes fluid flow through the orifice, into the chamber, dissipating a substantial portion of the fluid energy in thermal form and thereby reducing the shock transmitted to the vehicle.

2. The vehicle of claim 1 wherein the chamber has a visco-elastic section so that its volume is a function of the pressure within the chamber, and fluid energy may be dissipated upon expansion of the chamber.

3. The vehicle of claim 1 wherein the wheel has a rim, and at least a portion of the rim forms at least a portion of the wall of the reservoir.

* * * * *